J. ROTH.
TRANSMISSION MECHANISM.
APPLICATION FILED NOV. 2, 1921.

1,428,257.

Patented Sept. 5, 1922.
2 SHEETS—SHEET 1.

INVENTOR
JOHN ROTH.
BY Chas. E. Townsend
ATTORNEY.

J. ROTH.
TRANSMISSION MECHANISM.
APPLICATION FILED NOV. 2, 1921.
1,428,257.
Patented Sept. 5, 1922.
2 SHEETS—SHEET 2.
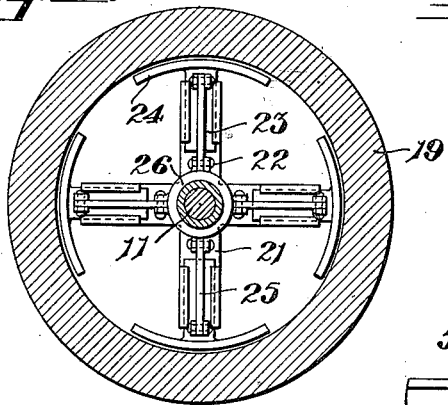
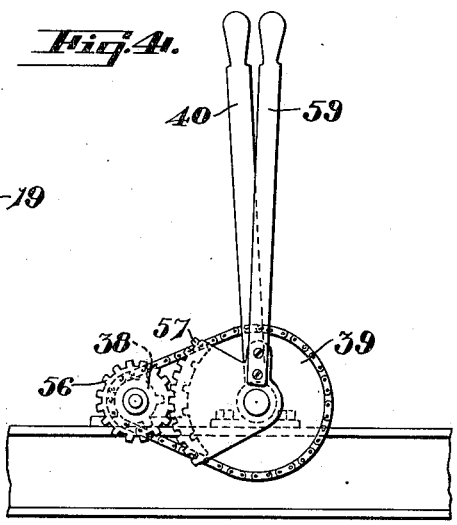
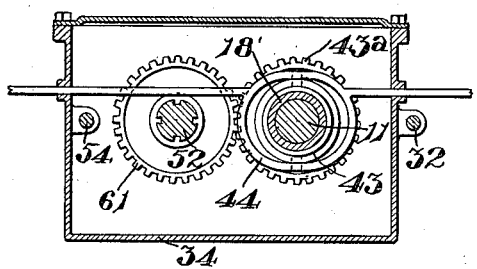
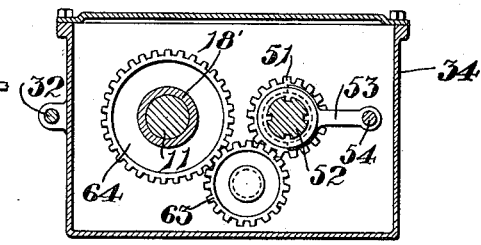
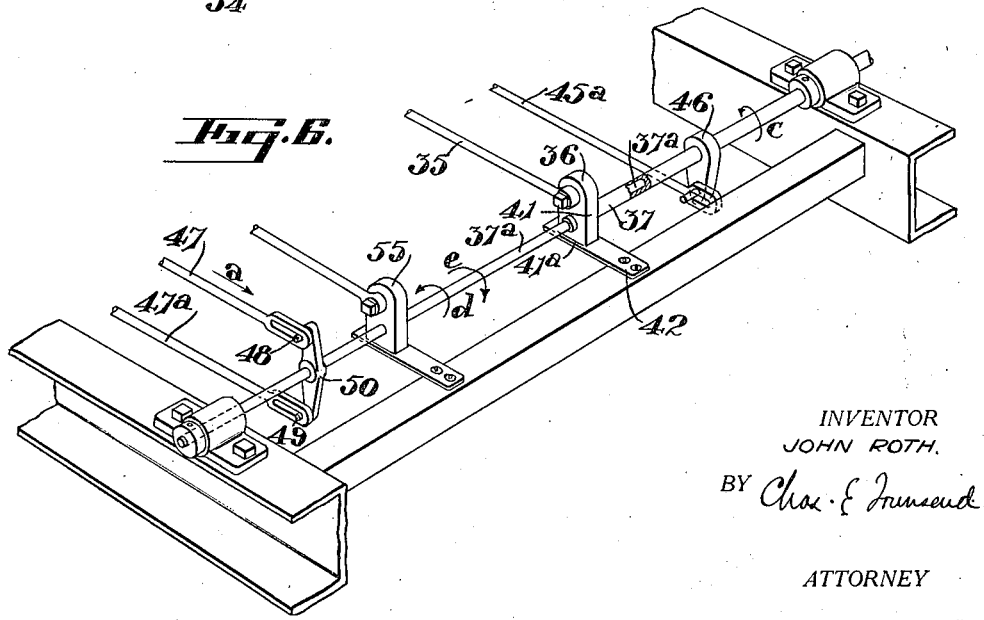
INVENTOR
JOHN ROTH.
BY Chas. E. Townsend
ATTORNEY Patented Sept. 5, 1922.

1,428,257

UNITED STATES PATENT OFFICE.

JOHN ROTH, OF RICHMOND, CALIFORNIA.

TRANSMISSION MECHANISM.

Application filed November 2, 1921. Serial No. 512,251.

*To all whom it may concern:*

Be it known that I, JOHN ROTH, a citizen of the United States, residing at Richmond, in the county of Contra Costa and State of California, have invented new and useful Improvements in Transmission Mechanism, of which the following is a specification.

This invention relates to power transmission, and particularly pertains to a variable speed transmission for motor vehicles.

It is the principal object of the present invention to provide a variable speed motor vehicle transmission which is so constructed as to insure that high and low gear ratios may be obtained by a direct driving action from the engine shaft to the differential mechanism of the rear axle, said invention further embodying means whereby other speeds and a reverse driving action will be quickly obtained by a simple shifting mechanism.

The present invention contemplates the use of a pair of alternately operating clutches which may be brought to separately engage the flywheel or other driving member of the engine, said clutches separately driving shafts carrying gears which mesh with other gears of different diameters; the shafts being also fitted with variable speed gears which may be shifted to obtain a desired driving ratio between the engine and the rear axle.

The invention is illustrated by way of example in the accompanying drawings, in which—

Fig. 2 is a view in section through the clutch and flywheel mechanism, as seen on the line 2—2 of Fig. 1.

Fig. 3 is a view in transverse section through the transmission box, as seen on the line 3—3 of Fig. 1.

Fig. 4 is a fragmentary view in elevation, showing the hand shifting lever mechanism.

Fig. 5 is a transverse section through the transmission box taken on line 5—5 of Fig. 1.

Fig. 6 is a perspective view of the control shaft and shifting rods connected thereto.

Figure 1:
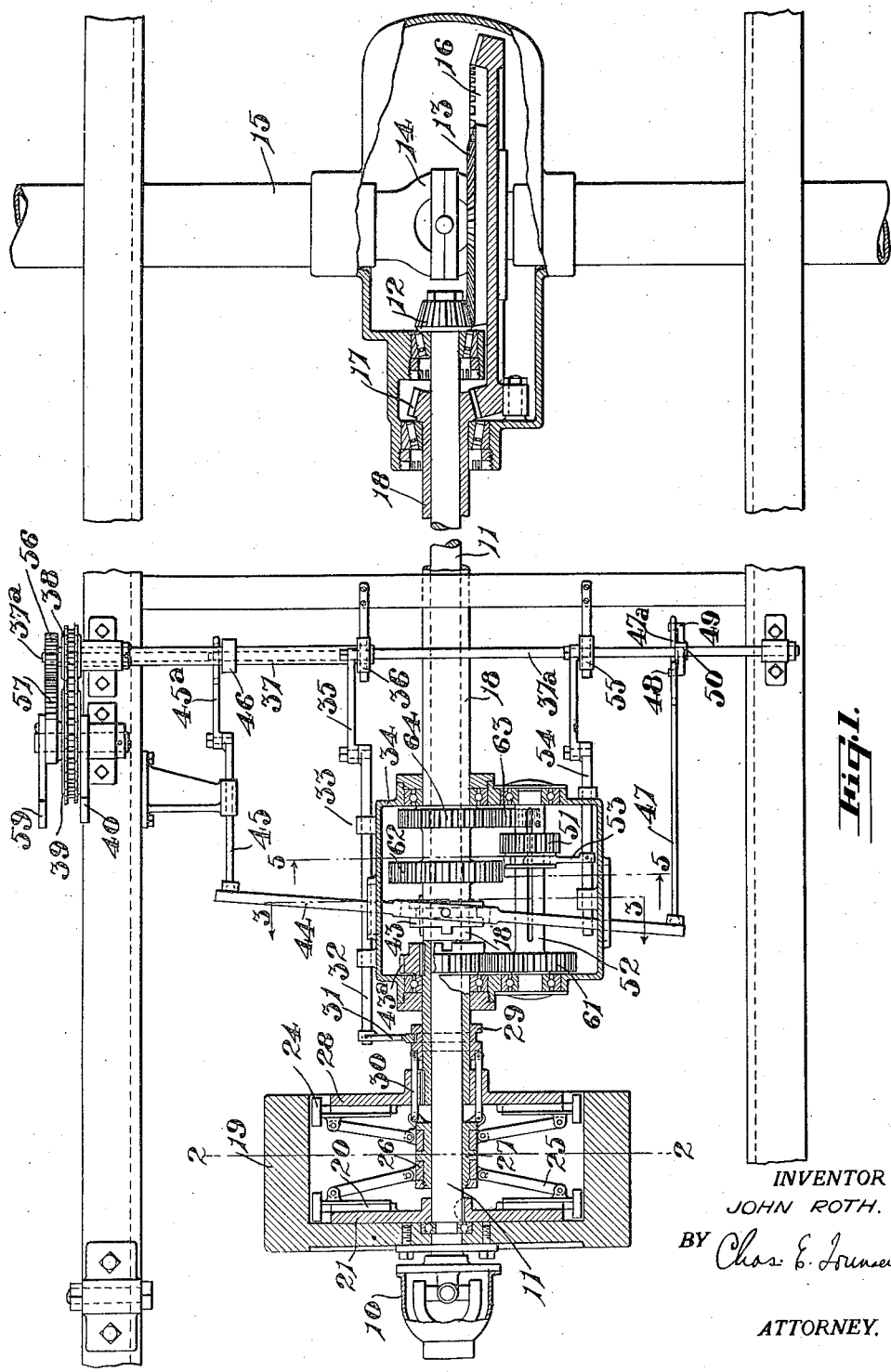
Fig. 1 is a fragmentary view in horizontal section and elevation, showing the vital parts of the present invention.

Referring more particularly to the drawings, 10 indicates a universal joint structure suitably connected with the driving shaft of a motor vehicle. This joint indirectly connects with a propeller shaft 11 which extends longitudinally of the vehicle and is fitted at its rear end with a driving pinion 12. The pinion 12 is in mesh with a master gear 13, suitably secured to a differential mechanism 14 on a rear axle structure 15.

Formed integral with the master gear 13 and arranged concentric therewith is a larger master gear 16 which is in mesh with a driving pinion 17. This pinion is fixed to the rear end of a propeller sleeve 18, through which the propeller shaft 11 telescopes.

The shaft 11 is freely mounted at its forward end within a bearing carried by the engine flywheel 19. This flywheel is directly connected to the universal joint 10, and indirectly connects with the shaft 11 through a clutch unit 20 which may be brought to engage the flywheel and lock it in driving relation to a spider 21. This spider is keyed to the propeller shaft 11.

Referring more particularly to Fig. 2 of the drawings, it will be seen that the spider is formed with a plurality of radial arms 22 which are slotted longitudinally to receive the sliding shanks 23 of clutch shoes 24. The clutch shoes are preferably arcuate, conforming to the inner circumferential face of the flywheel, and have broad faces which frictionally engage this portion of the flywheel. It will be understood, however, that the design of the clutch shoes and the formation or contour of the engaging faces of the clutch shoes and the flywheel may be altered without departing from the spirit of the present invention.

The shanks 23 of the clutch shoes are each formed with bosses to receive pressure links 25. These links are pivoted at their outer ends to these bosses and at their inner ends to a collar 26. This collar is rotatably supported upon a shifting sleeve 27 which slides longitudinally of the propeller shaft 11. The sleeve is formed to accommodate two collars 26, the other one of which is fitted with a plurality of pressure links 25 leading to clutch shoes 24 of a clutch unit 28.

The clutch unit 20 is provided to establish the "high" gear ratio of the transmission, while the clutch unit 28 is provided to establish the "low" gear transmission drive. These units may be alternately operated by a shifting collar 29 which is slidable along the sleeve 18 and which is fitted with a plurality of push rods 30 extending through the hub of the spider of clutch unit 28 to connect with the shifting collar 27. A fork 31 engages a groove in the collar 29 to move the same. This fork is carried at the end of a reciprocating rod 32 which extends through bars 33 on the transmission case 34. The opposite end of this rod is fitted with a link 35 pivotally connected with a crank 36.

This crank is secured to a hollow shaft 37 which is disposed about the transverse shaft 37$^a$ and is preferably fitted at its outer end with a sprocket 38 connected by chain to a larger sprocket 39, the latter being actuated by the hand lever 40, the intention being to produce considerable rotation of the sleeve shaft 37 so that the crank 36 may be swung to a position on either side of the center of the shaft 37. As will be further explained this shaft and its control mechanism controls the "high" and "low" drive of the transmission. It will be seen from Fig. 6 that the crank 36 is constructed to temporarily lock itself in its set positions. The flat sides 41 and 41$^a$ engaging the flat spring 42 at the end of each change of speed or in neutral, such engagement would prevent the crank from changing positions without the operator shifting the lever 40.

In order to positively interrupt the driving action of the sleeve 18 through to the gear 17 when "low" gear is not required, a clutch collar 43 is provided. This collar is splined onto the section 18′ of the tubular drive shaft 18, it being understood that the sections 18 and 18′ are in longitudinal alignment and both telescope over the drive shaft 11. Keyed onto the rear end of the tubular shaft section 18 is a reduction gear 43$^a$ having a clutch hub on its end face, which hub is adapted to be positively engaged by the adjacent face of the clutch collar 43. This action will lock the two sections of the tubular driving shaft together and will insure a direct driving action from the clutch unit 28 to the gear 17. A yoke lever 44 embraces the clutch collar 43 and is sescured at its outer end to a shift rod 45, which is in turn connected by a link 45$^a$ to crank lever 46 on the shaft 37. This crank lever is so disposed as to move the clutch collar forwardly and to its engaging position when the transmission lever 40 is swung to produce a "low" drive. The opposite end of the yoke lever 44 connects with a pair of shifting rods 47 and 47$^a$ which extend rearwardly to engage the ends 48 and 49 respectively of the lever 50. This lever is carried by the control shaft 37$^a$ which operates a sliding gear 51, which gear is splined to a counter-shaft 52 enclosed with in the gear case 34 and disposed parallel to the main drive shafts 11 and 18. This gear is formed with a grooved hub receiving a shifting fork 53 which fork is carried by a rod 54. The rod is pivotally secured to a crank 55 on the control shaft 37$^a$. The double crank arm 50 is so disposed in relation to the crank 55 as to cause one of the shifting members 47 to be drawn in the direction of the arrow $a$ at a certain point in the rotation of the shaft 37$^a$. Thus partial rotation of the shaft 37$^a$ in either direction will act upon the lever yoke 44 to move the clutch collar 43 from engagement with the clutch face of the gear 43, which disengagement is necessary when desiring to operate in either extreme low gear or reverse. The shaft 37$^a$ is rotated by means of a pinion 56 engaged by a gear segment 57, which segment is rotated by a second control lever 59.

The counter-shaft 52 is driven from the gear 43 by a gear 61, thus continuously imparting motion to the shifting gear 51 splined thereon. In its forward position the shifting gear will mesh with a reducing gear 62 secured to the section 18′ of the tubular drive shaft. In its rear position the shifting gear will mesh with a reversing pinion 63 which is in constant engagement with a reversing gear 64 fixed to the shaft section 18′.

It will thus be evident that the present structure will permit "high" and "low" gear drives to be directly obtained while allowing an extreme low and reverse drive to be obtained through a very simple train of gears.

In the operation of the present invention it will first be assumed that a "high" gear drive is desired. In this case shaft 37 will be rotated in the direction of the arrow $c$, as shown in Fig. 5. This will shift the rod 32 forwardly and will move the collar 37 toward the clutch unit 21. This will simultaneously produce a toggle action on all of the links 25 to force the clutch shoes 24 of the unit 21 outwardly, thus frictionally engaging the inner surface of the fly wheel 19. This will act to connect the clutch unit 21 with the fly wheel 19 and thus directly drive the central propeller shaft 11. Rotation of this shaft will be, of course, accompanied by rotation of the pinion 12, which is in mesh with the small master gear 13.

To shift from "high gear" to "low gear," the hand lever 40 is actuated to rock the shaft 37 in a direction reverse to that in which it was rocked when shifting into "high" gear. Such actuation of the shaft will exert a pull on the rod 32 disengaging the clutch unit 21 and engaging the clutch unit 28 which will connect the flywheel 29 to the tubular propeller shaft 18, the respective sections of the latter having been interconnected when the shaft 37 imparted movement to the lever 44, through the crank 46 and shift rod 47, which shifted the clutch collar 43 into engagement with the clutch collar on the gear 43$^a$ secured on the section 18 of the tubular shaft. When the clutch unit 43 is thus engaged, the rotation transmitted to the tubular propeller 18, by the engagement of the clutch unit 28, is transmitted to the section 18 of the tubular propeller shaft and to the pinion 17 secured thereon which is in constant mesh with the larger master gear 16 for driving the latter when the tubular shaft is driven, thus establishing a direct "low" drive without shifting gears.

As before stated an extreme "low" gear drive is provided, which, in the present instance, is accomplished by the provision of the countershaft 52 which is constantly driven from the tubular shaft 18, when the latter is in motion, by means of the intermeshing gears 43ª and 61 secured on the respective shafts. When desiring to operate in extreme low gear, the hand lever 59 is actuated to rock the control shaft 37ª in the direction of arrow "d", which exerts a pull on the rod 47ª connected to the lever 44, and in shifting the same disengages the clutch collar 42, thereby discontinuing the connection between the respective sections of the tubular shaft 18. Simultaneous with the shifting of the lever 44, the rock shaft 37ª actuates the crank 55, which imparts axial movement to the rod 54 and shifts the sliding gear 51 controlled thereby into engagement with the gear 52 secured on the second section 18′ of the tubular shaft. Such engagement of the gears 51 and 52 producing rotation of the second section of the tubular shaft reduced in speed in relation to that of the first section. Extreme low gear is thus obviously provided.

It being understood that when desiring to operate in either extreme low gear or in reverse, it is necessary to first shift into low gear drive, if not already operating in that gear.

To produce reverse drive, the operation is similar to that of shifting into the extreme low gear excepting the hand lever 59 is actuated to rotate the crank 55 in the direction of the arrow —c—, which will cause the sliding gear 51 to mesh with the reverse gear 63 which is in mesh with the gear 64 on the tubular shaft. The engagement of the sliding gear 51 with the reverse gear 63 will cause the section of the tubular shaft to rotate in a direction reverse to that of the rotation of the first section.

To allow the engine to idle the hand lever is returned to neutral position, likewise, the hand lever 40 is returned to neutral, thus returning the various engaging elements to their neutral positions and allowing the flywheel 19 on the engine shaft to rotate freely.

It is obvious from the foregoing that a mechanism has been provided that is not only comparatively simple in nature, but contains several distinct advantages over the present art and should be considered an advance thereover.

In the foregoing description and on the drawings various parts and combinations thereof have been described and shown more or less in specific detail for illustrating purposes only, and it is therefore understood that various changes in construction and arrangement of parts may be made by those skilled in the art without departing from the spirit of the invention as claimed.

Having thus described my invention, what I claim is:

1. In a transmission mechanism, a drive shaft, a rear axle unit having a differential with a pair of master gears of different diameters, a first and a second propeller shaft each having a pinion in constant mesh with a different master gear, clutch means for connecting either of said propeller shafts to said drive shaft whereby two different direct driving connections may be established between the drive shaft and the rear axle, said second propeller shaft being formed in two sections, and means whereby the speed of one of said sections may be reduced in relation to the speed of the other section.

2. In a transmission mechanism, a drive shaft, an axle unit having a differential with a pair of master gears of different diameters, a first and a second propeller shaft each having a pinion in constant mesh with a different master gear, clutch means for connecting either of said propeller shafts with said drive shaft, said second propeller shaft being formed in two sections, and controlled means whereby one of said sections may be driven by the other section at a reduced speed or in a reverse direction.

3. A transmission mechanism comprising a drive shaft, a driven shaft, a pair of bevel gears of different diameters fixed on said driven shaft, a first and a second propeller shaft interposed between said drive and said driven shafts, and each having a bevel pinion in constant mesh with a different bevel gear on the driven shaft, clutch means for directly connecting either of said propeller shafts with the drive shaft, said second propeller shaft being formed in two sections, means whereby a direct drive may be established between the drive and driven shaft through both of said sections, and controlled means whereby one of said sections may be driven by the other at a reduced speed or in a reverse direction.

4. A transmission mechanism, a drive shaft, a driven shaft, a pair of gears of different diameters fixed on the driven shaft, a first propeller shaft, a second propeller shaft formed in two sections turnably mounted on the first propeller shaft, each of said propeller shafts having a pinion in constant mesh with a different gear on the driven shaft, clutch means for establishing a direct driving connection between the drive and driven shafts through either of said propeller shafts, and clutch and gear means whereby one of the sections of the second propeller shaft may be driven by the other at a reduced speed, or in a reverse direction.

5. In combination with the drive shaft and the rear axle unit of a motor vehicle, of a pair of concentric bevel gears of different diameters operatively connected to said rear axle unit, a first propeller shaft, a second propeller shaft turnably mounted on the first propeller shaft, the second propeller shaft being formed in a first and a second section, each of said propeller shafts having a bevel pinion in mesh with a different one of said bevel gears, clutch means for establishing a direct driving connection between said drive shaft and rear axle through either of said propeller shafts, a clutch interposed between the sections of the second propeller shaft, a counter shaft, and gear mounted on the said propeller shaft sections and the counter shaft, and operable means connected to said clutch and one of said gears on the countershaft whereby said clutch may be actuated and said gear shifted to cause the first section of the propeller shaft to drive the second section at a reduced speed or in a reverse direction, or to permit a direct drive through both sections.

6. In a transmission mechanism, a drive shaft, a rear axle unit having a differential with a pair of master gears of different diameters, a first and a second propeller shaft each having a pinion in constant mesh with a different master gear in the differential, a double clutch unit adapted to establish a direct driving connection between the drive shaft and either of the propeller shafts, the second propeller shaft being formed of a first and a second section, means for transmitting a direct drive through both sections, and other means actuated by the first section for indirectly transmitting either a reduced speed to the second section, or rotation of the second section which is the reverse of that of the first section.

7. In a transmission mechanism, a drive shaft, a rear axle unit having a differential with a pair of master gears of different diameters, a first and a second propeller shaft each having a pinion in constant mesh with a different master gear in the differential, a double clutch unit adapted to establish a direct driving connection between the drive shaft and either of the propeller shafts, the second propeller shaft being formed of a first and a second section, a counter-shaft geared to the first section of the propeller shaft, a slidable gear on the countershaft, a gear on the second section of the propeller shaft adapted to transmit reduced rotation thereto when engaged by the slidable gear, a reversing gear also on the second section, and means for simultaneously disengaging the first and second sections of the propeller shaft and shifting the slidable gear into mesh with either the speed reducing gear or the reversing gear on the propeller shaft.

JOHN ROTH